United States Patent [19]

Varnovitsky

[11] 4,438,376
[45] Mar. 20, 1984

[54] VARIABLE SLIP CONTROLLER FOR AN AC MOTOR

[75] Inventor: Marlen Varnovitsky, Schenectady, N.Y.

[73] Assignee: General Electric Company, Schenectady, N.Y.

[21] Appl. No.: 334,350

[22] Filed: Dec. 24, 1981

[51] Int. Cl.³ .......................... H02P 5/40; H02P 5/46
[52] U.S. Cl. ...................................... 318/78; 318/811
[58] Field of Search ................... 318/70, 72, 78, 107, 318/110, 803, 802, 801, 807–811

[56] References Cited

U.S. PATENT DOCUMENTS

| 3,164,760 | 9/1961 | King | 318/72 |
| 3,808,976 | 5/1974 | Bessire | 318/78 |
| 4,266,176 | 5/1981 | Fulton | 318/801 |
| 4,281,276 | 6/1981 | Cutler et al. | 318/803 |
| 4,286,203 | 8/1981 | Ehret | 318/801 |
| 4,335,343 | 6/1982 | Dreiseitl et al. | 318/803 |

OTHER PUBLICATIONS

Athani, V. V., "Microprocessor Control of a Three—Phase Invertor in Induction Speed Control System," IEEE Trans. on Industrial Electronics & Control, vol. IECI—27, No. 4, 11-q.

Primary Examiner—David Smith, Jr.
Attorney, Agent, or Firm—Donald R. Campbell; James C. Davis, Jr.; Marvin Snyder

[57] ABSTRACT

A control system is provided in which a signal proportional to the actual rotor speed of an induction motor is coupled to a variable gain amplifier. Changes in the commanded gain of the amplifier electronically control the ratio between rotor speed and the output signal amplitude of the variable gain amplifier. The output of the variable gain amplifier determines the commanded stator frequency. Disks optically encoded with a PWM pattern are driven at a speed which corresponds to the commanded stator frequency. Optical sensors read the pattern and provide switching signals to an inverter coupled to an induction motor.

2 Claims, 5 Drawing Figures

VARIABLE SLIP CONTROLLER FOR AN AC MOTOR

This invention relates to a closed-loop control system for an AC motor, and more particularly, to a variable slip control system for an induction or synchronous motor.

The angular speed of the shaft of an AC motor depends on the frequency of the voltage applied to its windings. The applied power creates a variable magnetic field in the air gap between the stator and the rotor of the AC motor. This field is usually mathematically described in terms of its magnetic flux expressed in vector form. In such a description the vector of the air gap flux is rotating with an angular speed equal to the frequency of the applied AC voltage.

In a synchronous motor the angular speed of the shaft during steady-state operation is exactly equal the speed of the air-gap flux vector, hence the term "synchronous speed". In an induction motor, there is, in general, a difference in speed between the air-gap flux vector and the rotor. This difference is usually called "slip" and is often measured in relative units with respect to the synchronous speed, which is the speed of the air gap flux vector.

In a variable-speed drive, the motor is required to deliver a useful torque through a wide range of shaft speeds. It is clear that an AC motor is not suitable for a variable speed drive if the applied voltage has a constant frequency. A synchronous motor falls out of synchronism and stops when the angular position difference between the rotor and the air gap flux vector exceeds $\pi/2$ radians, and the induction motor stops when the slip exceeds a certain critical value (breakdown).

In order for an AC motor to be useful for a variable speed drive, it is necessary to supply it with power of variable frequency. It is also necessary that this frequency be a function of the motor shaft speed. In the case of a synchronous motor, the frequency should be equal to the angular speed of the shaft, in the case of an induction motor it should be determined by the relation $$\omega = (1+s)\cdot\Omega$$

where
$\omega$ is the frequency
$\Omega$ is the speed of the shaft
S is the slip.

It is an object of the present invention to improve the controllability of an induction motor drive by providing a torque control system whose torque-speed characteristic is almost linear in a wide speed range.

SUMMARY OF THE INVENTION

Briefly, in one aspect of the present invention a signal proportional to the actual rotor speed of an induction motor is coupled to a variable gain amplifier. Changes in the commanded gain of the amplifier electronically control the ratio between rotor speed and the output of the variable gain amplifier. The output of the variable gain amplifier determines the commanded stator frequency. A PWM signal generator receives the commanded stator frequency signal and provides switching signals to a power inverter from which power is supplied to the stator of the motor.

In another aspect of the present invention, the PWM generator has two optically encoded disks rotated at an angular speed equal to the commanded stator frequency. The disks contain the pulse width and pulse polarity information. Three pairs of optical-interrupter modules are fixed around the periphery of the disks spaced 120° apart. The sensors, one pair for each of the three phases, convert the optically encoded information to trains of electrical switching pulses which control the switching elements of the power inverter.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE PREFERRED EMBODIMENT

Figure 1:
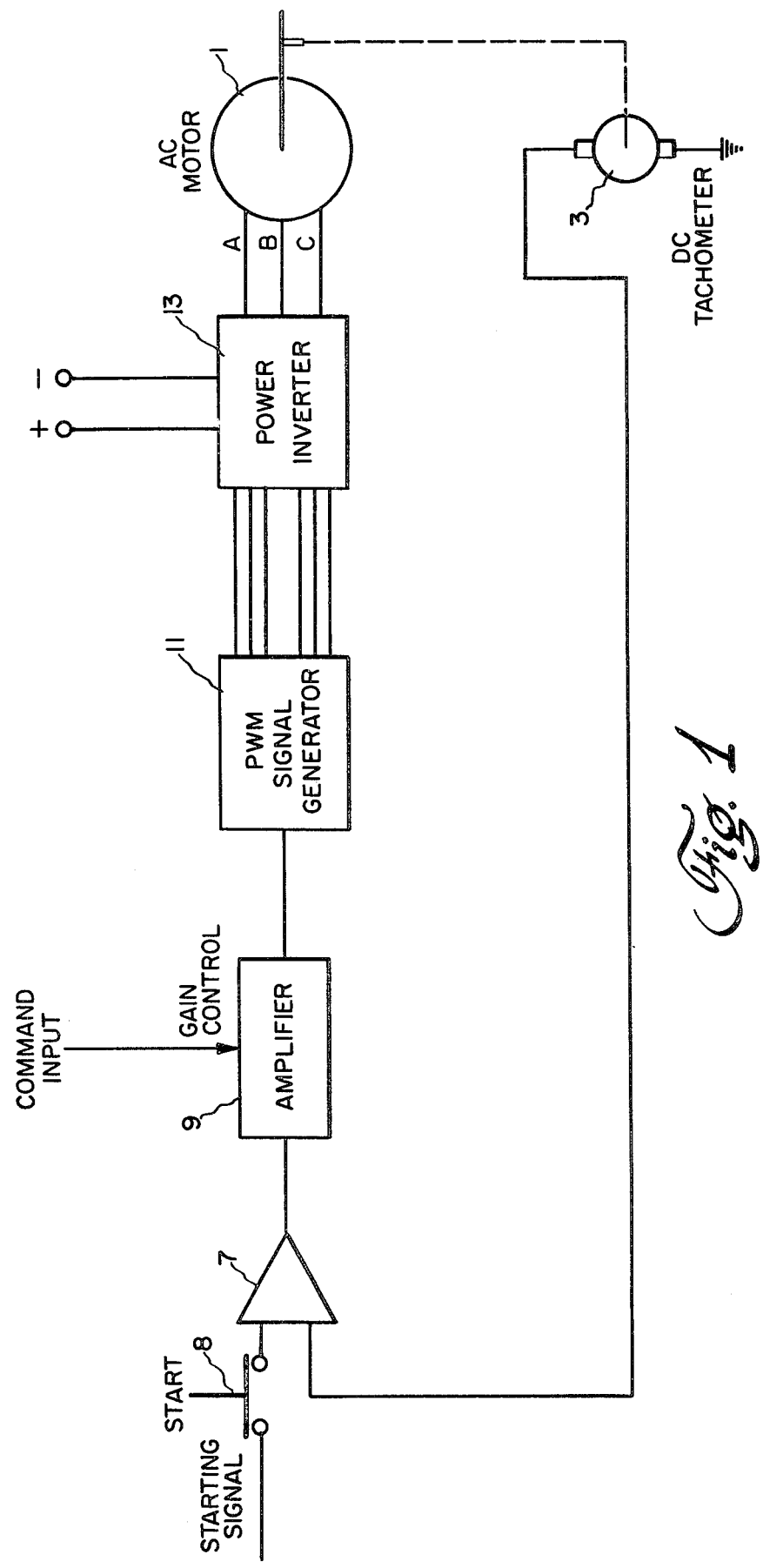
FIG. 1 is a block diagram of a closed-loop control system of an AC motor having an adjustable gain of an amplifier as the input.

Referring now to the drawing and especially FIG. 1 thereof, an AC motor 1 has its shaft connected to drive a DC tachometer 3. The output voltage of the DC tachometer is proportional to the angular speed of the shaft of motor 1. The signal from the DC tachometer 3 is directed to one input of a two input electronic summer 7. A predetermined voltage from a power source (not shown) is coupled through a normally open starting switch 8 to the other input of summer 7. The output of summer 7 is connected to the input of a variable gain electronic amplifier 9. A gain control signal is provided to the amplifier to electronically control the ratio between the rotor speed and the commanded stator frequency provided by the amplifier. The output of amplifier 9 is coupled to a PWM signal generator 11, which is shown in more detail in one embodiment in FIG. 2 and still more detail in another embodiment in FIG. 3. The output of the PWM signal generator is connected through an electronic interface circuit to the input terminals of the base driving circuits of the switching transistor power inverter. The output points of all phases of the power inverter are connected with the terminals of the windings of respective stator phases of the AC motor.

The operation of the closed-loop system of FIG. 1 will now be explained. The mathematical relation between the angular speed of the shaft of an AC motor and the frequency of the applied voltage can be expressed in terms of slip. Slip is defined as the difference in angular speed of the vector of magnetic flux in the air gap of the motor and the angular speed of the motor shaft.

Slip is often measured as follows:

$$S = (\omega - \Omega)/\omega \tag{1}$$

where

ω is applied voltage frequency, or synchronous speed i.e., the angular speed of the air-gap flux vector and
Ω is angular speed of the motor shaft
Rearranging terms, we obtain $$\omega = 1/1 - S\cdot\Omega = K\cdot\Omega \qquad (2)$$

which can be interpreted as follows. An AC motor has to be supplied with power whose frequency is proportional to the speed of the motor shaft. The proportionality factor K depends on the desired slip.

For a synchronous motor the slip is zero, i.e., K=1, for an induction motor, in general K may take various values both greater, equal or less than 1.

Figure 4A:
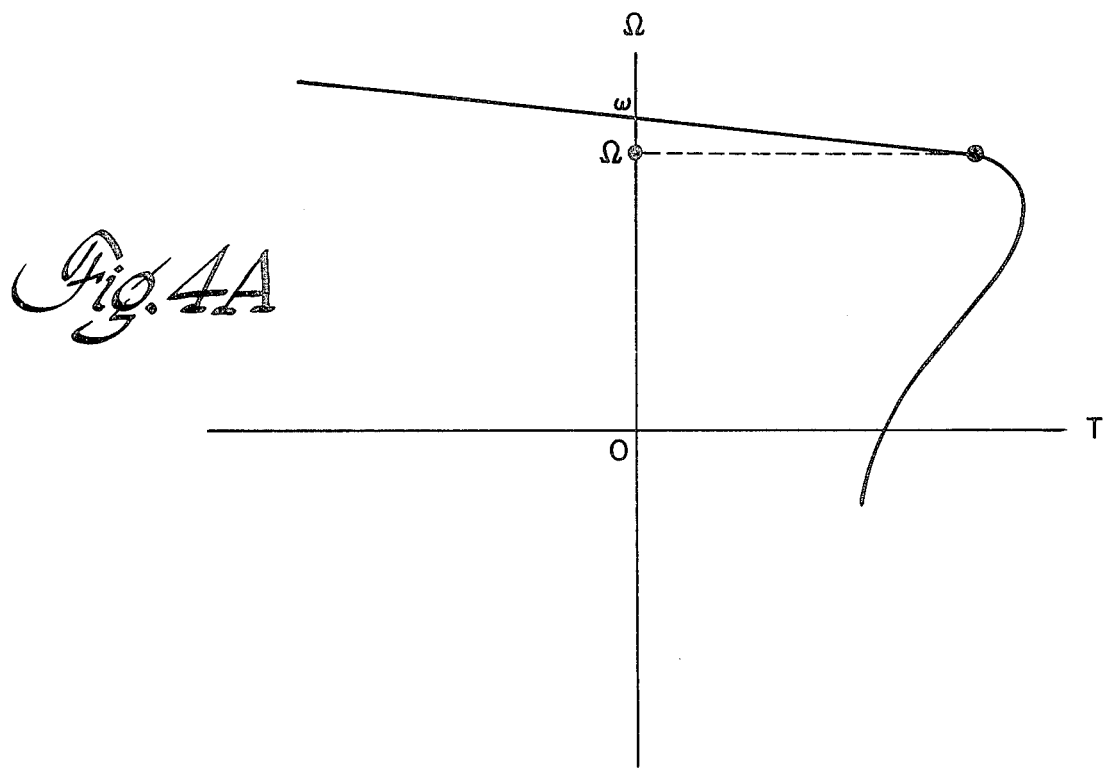
FIGS. 4A and B are steady state torque and speed relationships of the induction motor helpful in explaining the operation of FIGS. 1, 2 and 3.

As can be seen from FIG. 4A a typical steady-state torque-speed curve, for any applied frequency, the magnitudes of slip are limited by the extrema of the torque-speed curve. It is also seen that positive slip (K>1) corresponds to motoring (T>0) negative slip (K−1) corresponds to braking (T<0) and zero slip or synchronous speed (K=1) corresponds to coasting of the motor (T=0). It is also evident that expression (2) becomes indeterminate when S=1, i.e. for the stalled rotor.

In operation, in order to start the system the starting switch 8 (which can be a pushbutton) has to be closed. A small constant DC starting signal is thus applied through the summer 7 to the input of variable gain amplifier 9. The output of the variable gain amplifier is connected to the input of the PWM signal generator 11, causing it to generate a starting PWM signal of low frequency. As soon as, under the influence of this starting signal, the motor starts to rotate, the feedback signal from the DC tachometer 3 comes through the other input of the summer 7, and the system begins closed-loop operation. After the magnitude of the feedback signal exceeds the magnitude of the starting signal, the latter becomes unnecessary, and the switch 8 may be reopened.

Figure 4B:
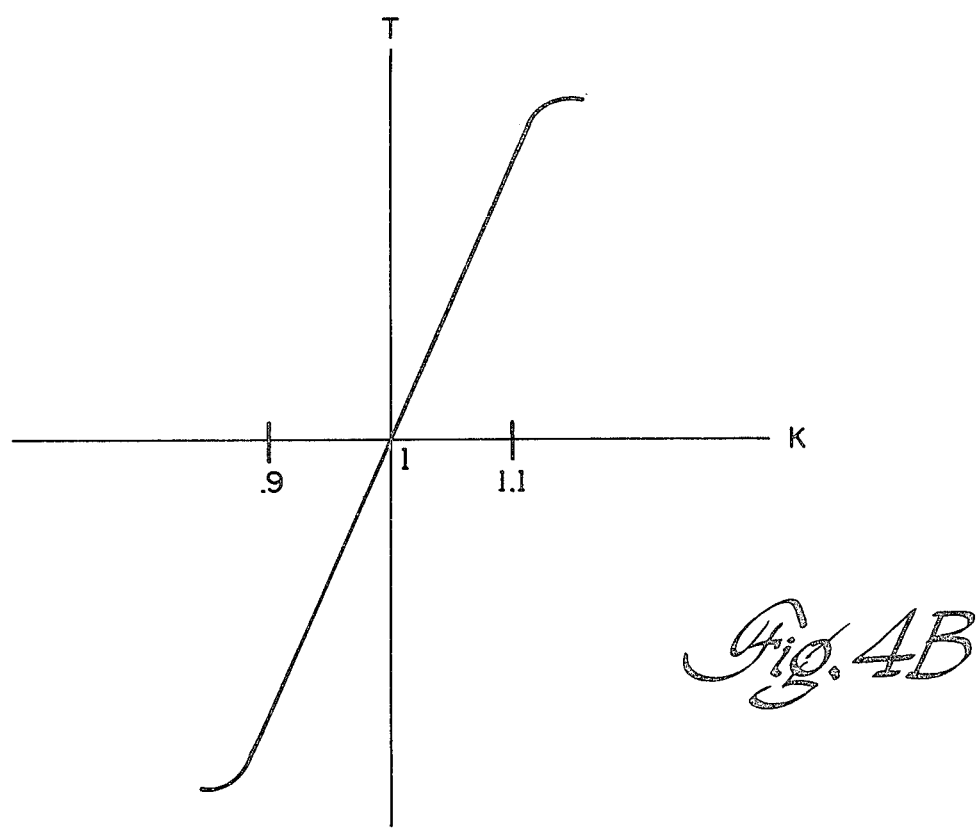

The frequency of the signal generated by the PWM signal generator is determined by the rotation speed of the disks, which, in turn is determined by the value of the gain of the amplifier 9. By varying this gain, the ratio of the generated frequency with respect to the motor shaft speed, that is the slip of the motor can be controlled. Since the developed torque of the motor depends on the motor slip, as presented in FIG. 4B, the motor acceleration and, consequently, the angular speed and position of the motor shaft can be controlled.

Figure 2:
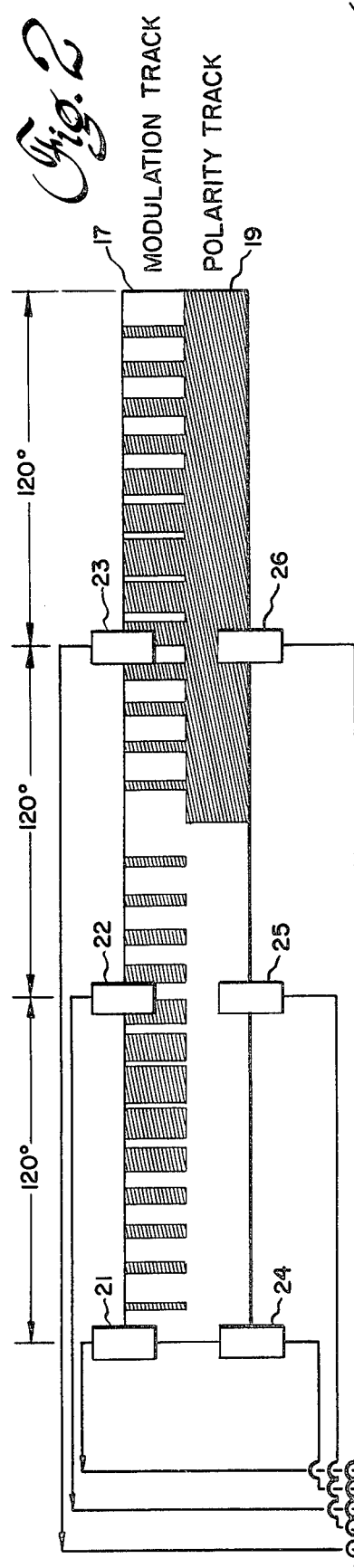
FIG. 2 is a block diagram of the PWM signal generator of FIG. 1 and a schematic diagram representation of the inverter of FIG. 1.
Figure 2:
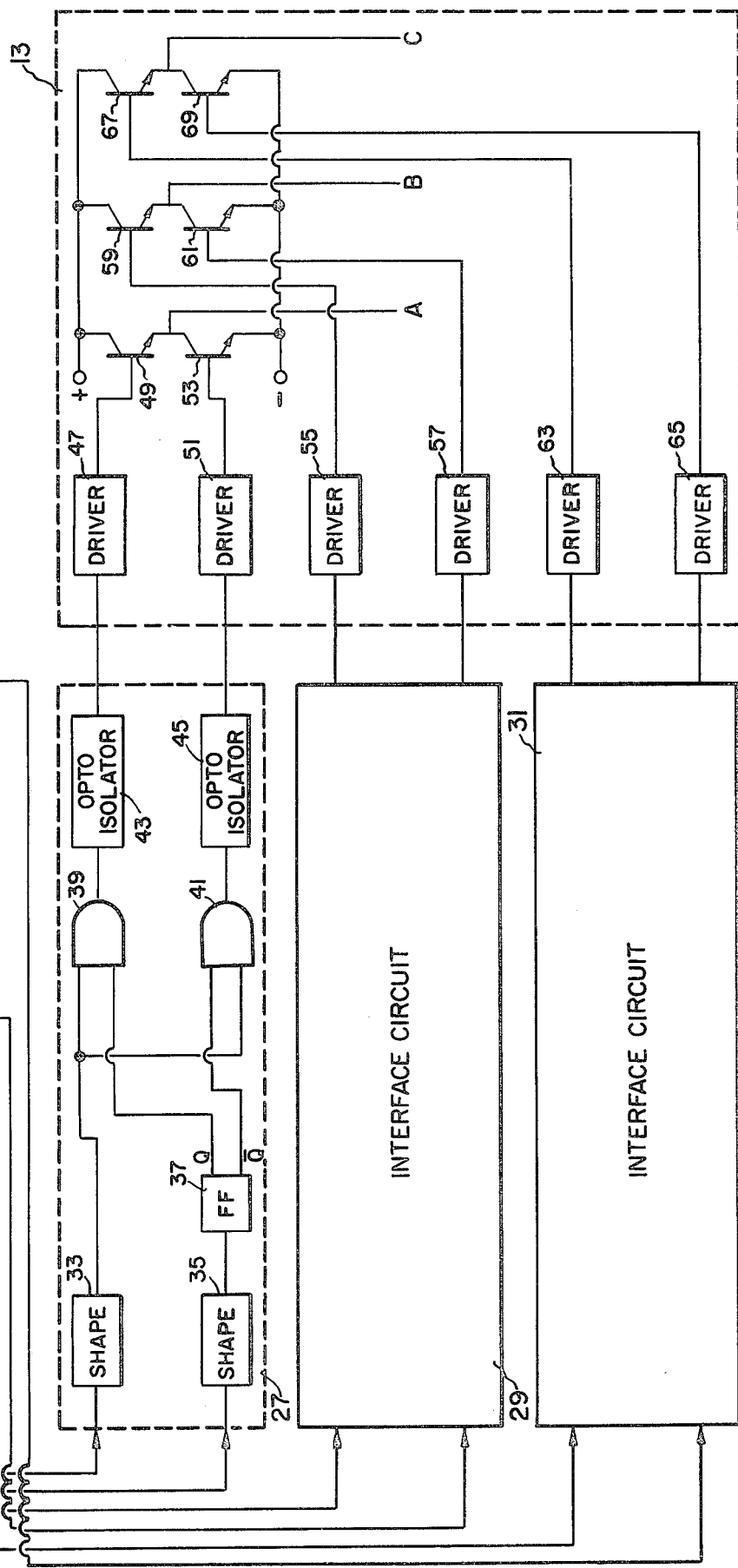

Referring now to FIG. 2, a block diagram of the pulse width modulated signal generator 11 is shown. A modulation track 17 containing pulse width modulation information and a polarity track 19 which determines switch selection in the inverter are placed on two disks adjacent to one another. Cylinders may also be used with the tracks forming continuous bands. The tracks 17 and 19 are shown cut open and laid flat. Sensors 21, 22 and 23 in the form of optical interrupter modules are mounted about the periphery of the disks spaced 120° from one another. Sensors 21, 22 and 23 are shown equally spaced along the laid out pulse width modulation track 17. Similarly, sensors 24, 25 and 26 in the form of optical interrupter modules are mounted about the periphery of the other disk spaced 120° from one another. Sensors 24, 25 and 26 are shown equally spaced along the polarity track 19. Each pair of sensors 21 and 24, 22 and 25, and 23 and 26 sense switching information relating to phases A, B and C, respectively, of the inverter 13. The tracks move relative to the sensors at a speed proportional to the output of variable gain amplifier 9. The output from each pair of sensors is connected to an interface circuit 27, 29 and 31, respectively. Signals from sensors 21 and 24 are each connected to a shaping circuit 33 and 35, respectively, in interface circuit 27. The output of shaping circuit 35 clocks a flip-flop 37 which has two outputs of opposite logical states which both change when the flip-flop is clocked. The output of the shaping circuit and one of the outputs of flip-flop 37 are connected to different inputs of a two input AND gate 39. The output of shaping circuit 33 and the other output of flip-flop 37 are connected to different inputs of a two input AND gate 41. The output of AND gate 39 is connected to opto-isolator 43 which, in turn, is connected to a base drive circuit 47 in inverter 13. The base drive circuit 47 is connected to the upper transistor 49 of the A phase of the inverter. The input of AND gate 41 is connected to an opto-isolator 45 which is connected through a base drive circuit 51 to the lower transistor 53 of the A phase of the inverter 13. Similarly, interface circuit 29 receives signals from the sensor pair 22 and 25 and provides signals to base drive circuits 55 and 57 which in turn supply the upper and lower transistors 59 and 61, respectively, of the B phase of the inverter. Interface circuit 31 receives signals from the sensor pair 23 and 26, and provides signals to base drive circuits 63 and 65 which in turn are connected to the upper and lower transistors 67 and 69, respectively, in phase C of the inverter.

Inverter 13 has three legs located between a positive and negative rail. An external power supply, not shown, provides DC power to the rails. The first leg has transistors 49 and 53 connected in series, the second leg has transistors 59 and 61 connected in series and the third leg has transistors 67 and 69 in series. The output of the transistors are taken between each of the series transistors, with the output corresponding to phase A taken between transistors 83 and 85, phase B between transistors 59 and 61, and phase C between transistors 67 and 69. Free-wheeling diodes in the power inverter are not shown for siimplification of the drawing.

In operation, the sensors 21, 22 and 23 mounted adjacent the modulation track 17 and sensors 24, 25 and 26 mounted adjacent the polarity track 19 provide pulse width modulation and polarity signals dependent upon whether a dark or transparent section is detected, to the interfaces 27, 29 and 31. Pulse width and polarity signals for phase A are provided to interface 27. Pulse shaping circuits 33 and 35 provide sharp edges to the transition of optically decoded pulses from one logic state to the other. The pulse from the polarity disk determine whether AND gate 39 or 41 will be enabled by the pulse width modulated pulses from the modulation track. The pulses from AND gate 39 drive the upper transistor 49 and pulses from AND gate 41 drive the lower transistor 53 of inverter 13. Each of the sensor pairs for phase B (22 and 25) and phase C (23 and 26) are similarly connected to interface circuits 29 and 31, respectively, to pulse width modulate the other transistors in inverter 13. Interface circuits 27 and 29 are configured identically to interface circuit 27.

Figure 3:
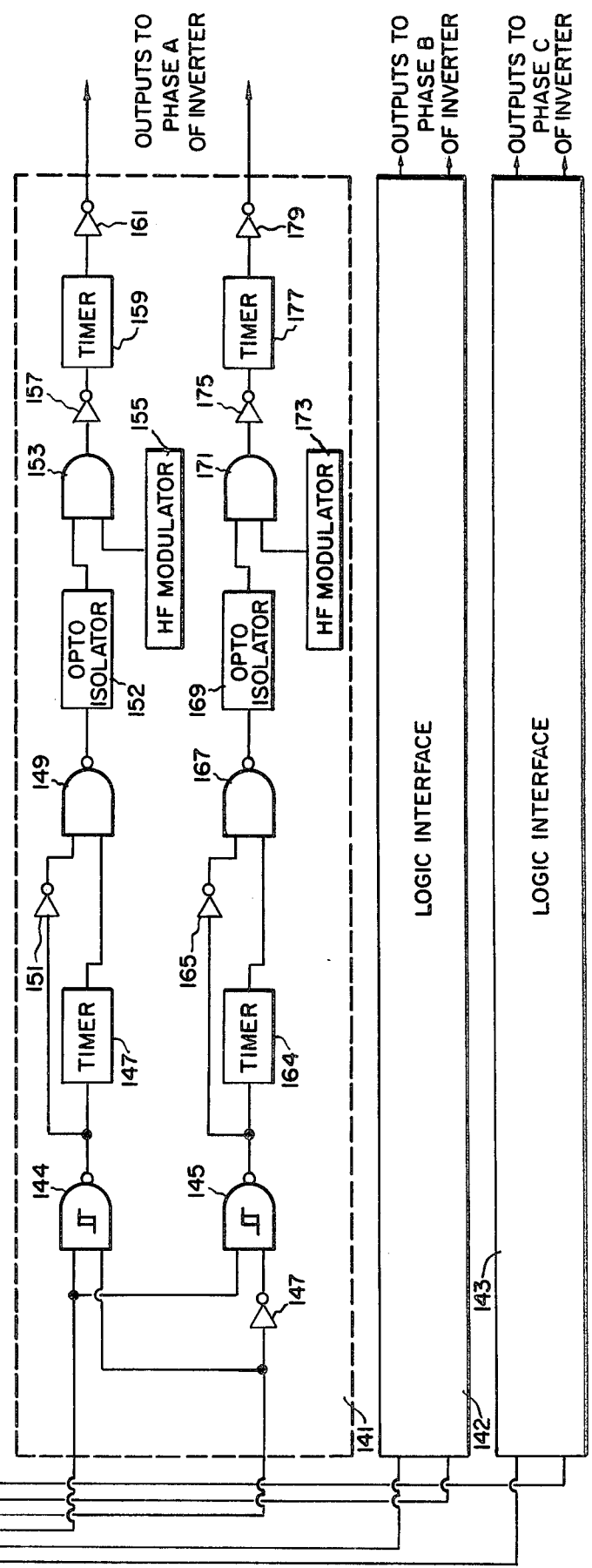
FIG. 3 is a schematic diagram representation of the PWM signal generator of FIG. 1.

When the speed at which the motor operates varies in a wide range, the pulse width modulation pattern which is best suitable for control purposes, should be used. Since in practice it is desirable to keep the switching frequency of the transistors in the power inverter approximately constant, the number of pulses and their relative widths in the pattern has to change. Several disks with patterns designed for different speed ranges can be used. Referring now to FIG. 3, the pulse width modulated signal generator 11 is shown in a preferred embodiment as a DC motor 17 receiving a speed command signal from the variable gain amplifier 9. The output shaft of the DC motor 17 drives several optically encoded disks. Three disks, 119, 121 and 123 are shown in the present embodiment. Disk 119 contains pulse polarity information, while disks 121 and 123 contain sinusoidally varying pulse width patterns. Three sensors in the form of optical interrupter modules are mounted equally spaced 120° about each of the disks to read the optically encoded information, one sensor for each phase of the inverter. Sensors 127, 128 and 129 are positioned about disk 119, sensors 130, 131 and 132 are positioned about disk 121, sensors 133, 134 and 135 are positioned about disk 123, with the sensors corresponding to phases A, B and C, respectively. Sensors mounted on disks 121 and 123 relating to the same phase 130 and 133, 131 and 134, 132 and 135 are alternatively connected by switches 137, 138 and 139, respectively, to logic interfaces 141, 142 and 143 for phases A, B and C. Switches 137, 138 and 139 are controlled by disk selector 125 which has an input of motor shaft speed. Signals from the sensors associated with disk 119 are also coupled to logic interfaces 141, 142 and 143, respectively.

The signal from the PWM disk selected by the disk selector based on the motor shaft speed provides one input to a two input NAND gate 144 and one input to a two input NAND gate 145. NAND gates 144 and 145 also have a Schmitt trigger to shape the pulses. The signal from sensor 127 which decodes the polarity signal on disk 119 for phase A is coupled through an inverter 147 to the other input of NAND gate 145 and the signal from sensor 127 is directly coupled to the other input of NAND gate 144. The output of NAND gate 144 is connected to a timer 147, the output of which is connected to one input of a two input NAND gate 149. The output of NAND gate 144 is also connected to an inverter 151 which is connected to the other input of NAND gate 149. The output of NAND gate 149 is connected to an optical isolator 152, the output of which is connected to one input of an AND gate 153. The other input to AND gate 153 is provided by a high frequency modulator 165. The output of AND gate 153 is coupled through an inverter 157 to a timer 159. The output of the timer is coupled to an inverter 161 and to a base drive circuit. The output of NAND gate 145 is coupled to a timer 165 and the output of NAND gate 145 is also coupled through an inverter 165. The output of the timer 164 and the inverter 165 are each coupled to one input of a two input NAND gate 167. The output of the NAND gate 167 is coupled to an optical isolator 169. The output of the optical isolator is coupled to one input of a two input AND gate 171. The other input of the AND gate 171 is provided from a high frequency modulator 173. The output of AND gate 171 is coupled through an inverter 175 to a timer 177, the output of the timer is coupled through a logic inverter 179. Logic interfaces 142 and 143 are configured identically to logic interface 141 just described. The output of logic interface 141 provides switching signals to the upper and lower transistors in the first leg of inverter 13. The output of logic interface 142 provides switching signals to the transistors in the second leg, and logic interface 143 provides switching signals to transistors in the third leg of inverter 13.

The operation of FIG. 3 will now be described. The output of the variable gain amplifier 9 of FIG. 1 drives a DC motor 17 which rotates disks 119, 121 and 123 at a speed proportional to the commanded inverter frequency. Depending on the magnitude of the signal from the motor shaft speed, the disk selector chooses between disks 121 and 123 to maintain a desired ratio of volts per Hertz operation. Disks 121 and 123 each have the PWM pattern optically encoded, with disk 123 having greater pulse widths than disk 121, resulting in a larger voltage magnitude command. Disk selector 125 selects disk 121 or 123 dependent on the magnitude of the output of the variable gain amplifier. At low frequencies, disk 121 having a greater number of narrower pulses for a lower voltage magnitude and a desired transistor switching frequency encoded thereon would be selected for starting. The three sensors mounted on the selected PWM disk and the sensors on the polarity disk provide pulse width modulation and polarity information to the interfaces 141, 142 and 143. Pulse width and polarity information for phase A is provided to interface 141. When a sensor mounted on the circumference of a disk has a darkened portion of the disk passed between the light source and the light sensitive sensor, a high logic state signal is generated. In the present embodiment, a darkened band on the polarity disk indicates the upper switch is to be controlled. Thus, when the sensors associated with phase A are both detecting a darkened area, both inputs to interface 141 are high. The two high inputs to NAND gate 144 results in a low logic level signal to timer 147. The timer serves to limit the maximum length of the pulse applied to a switching transistor in the inverter. This feature is a precautionary protective measure which is important at low speeds of the disks or when the disks stop. Timer 147 is triggered by the transition from a high to a low logic level and when triggered provides a high output for a predetermined time. In the present embodiment, the predetermined time is 0.4 seconds, which time is the maximum pulse length. The parallel path around timer 147 through inverter 151 results in low level output pulses from NAND gate 149 of 0.4 seconds or shorter duration. The output of NAND gate 149 passes through optical isolator 152 which provides voltage level separation. Since the desired frequency range of switching transistors in the inverter is normally much higher than the frequency which can be generated by the optically encoded disks, secondary modulation can be used on the PWM pattern. A high frequency modulating signal, which is 1 kHZ in the present embodiment, is combined with pulses in AND gate 153 to provide higher transistor switching frequencies. This measure improves the harmonic content of the current signal. The pulses are inverted in logic inverter 157 and trigger timer 159 on high to low transitions. The duration of timer 159 can be adjusted to vary the duty cycle of the pulses. When timer 159 is triggered, a high pulse output is provided until the timer times out. The output of timer 159 is connected to the upper transistor in the first leg of the inverter 13 shown in FIG. 2. As long as the polarity signal is high, the upper transistor will receive pulses. When the polarity signal is low, which occurs when the transparent portion of the disk is sensed by the sensor, NAND gate 145 will then begin to provide low pulses to timer 164 when the pulse width modulated pattern is sensed. Pulses are shaped as previously described when the polarity signal was high. Each of the sensors for phase B and C are similarly connected to interface circuits 142 and 143, respectively, to pulse width modulate the other transistors in inverter 13.

The foregoing describes a torque control system whose torque-speed characteristic is also linear in a wide speed range.

While the invention has been particularly shown and described with reference to a preferred embodiment thereof, it will be understood by those skilled in the art that various changes in form and details may be made therein without departing from the spirit and scope of the invention.

What is claimed is:

1. A variable slip control system for an AC motor comprising:
   means for generating a voltage signal proportional to the shaft speed of said AC motor;
   variable gain amplifier means for controlling the ratio between motor shaft speed and stator frequency and thus the slip and for receiving said shaft speed signal and providing a signal proportional to stator frequency which is dependent on commanded gain;
   means for providing a DC starting signal to said variable gain amplifier means;
   pulse width modulation signal generator means for rotating optically encoded means at a speed proportional to said frequency signal and for scanning the last-mentioned means and optically decoding information thereon into electrical pulse width modulation switching pulses which are supplied to appropriate switches in an inverter;
   said inverter supplying variable frequency and variable magnitude power to the stator of said AC motor.

2. The control system of claim 1 wherein said pulse width modulation signal generator means is comprised of a DC motor to which said frequency signal is fed, said optically encoded means being driven by the shaft of said DC motor and providing pulse width modulation and polarity information.

* * * * *